United States Patent [19]

Hagar

[11] 4,088,146
[45] May 9, 1978

[54] APPARATUS AND METHOD FOR SEALING DAMPERS

[76] Inventor: Donald K. Hagar, Allentown, Pa.

[21] Appl. No.: 710,379

[22] Filed: Aug. 2, 1976

[51] Int. Cl.² .................... F16K 3/312; F16K 25/00
[52] U.S. Cl. .................................. 137/1; 251/174; 251/328; 138/94.3
[58] Field of Search .............. 251/174, 328, 214; 137/242; 138/94.3

[56] References Cited

U.S. PATENT DOCUMENTS

| 1,054,150 | 2/1913 | Thorsby | 251/327 X |
|---|---|---|---|
| 2,732,170 | 1/1956 | Shand | 251/132 |
| 3,206,162 | 9/1965 | Bogot | 251/172 |
| 3,228,389 | 1/1966 | Lowe et al. | 251/172 X |
| 3,333,816 | 8/1967 | Williams et al. | 251/327 |
| 3,504,883 | 4/1970 | Beck | 251/172 |
| 3,698,429 | 10/1972 | Lowe et al. | 251/174 X |
| 3,738,393 | 6/1973 | Alexandrov et al. | 251/326 X |
| 3,799,187 | 3/1974 | Armstrong | 251/328 X |

FOREIGN PATENT DOCUMENTS

| 324,654 | 8/1920 | Germany | 251/174 |

Primary Examiner—Arnold Rosenthal
Attorney, Agent, or Firm—Bacon & Thomas

[57] ABSTRACT

An apparatus and method for sealing a flow control apparatus, such as a damper, suitable for controlling the flow of fluids in a conduit, especially high temperature gases in flue ducts. The damper includes a closure member which may be removed entirely from the fluid stream by sliding movement through an aperture. Fixedly mounted, cooperating, flat, resilient strips seal the aperture in both the open and closed positions of the damper. Resilient support strips on both sides of the sealing strips control the resistance to flexure of the sealing strips. To prevent damage to the sealing strips as the closure member is withdrawn from the closed position, the sealing strips are allowed to buckle by moving from a condition of concave bending with respect to the interior of the fluid passageway to a condition of convex bending with respect thereto. The resistance to flexure of the sealing strips is controlled to ensure that the seals will not be opened by pressure or vacuum within the fluid passageway when the closure member is in the open position.

28 Claims, 12 Drawing Figures

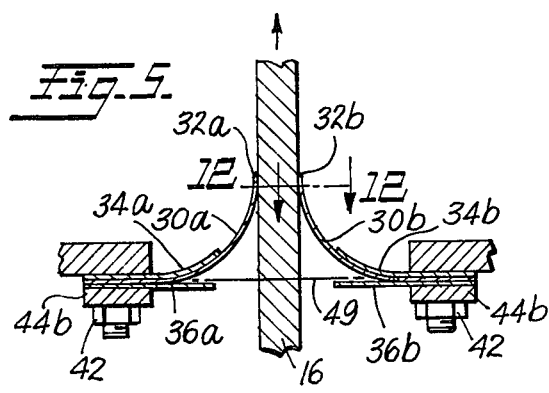
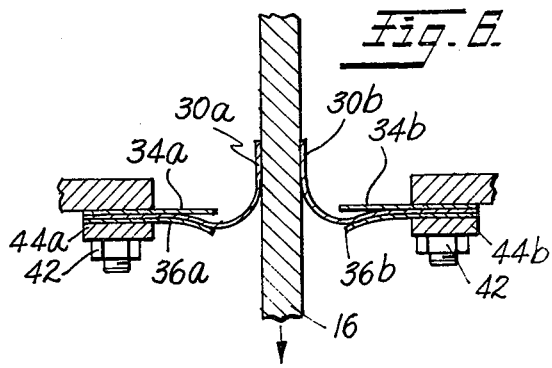
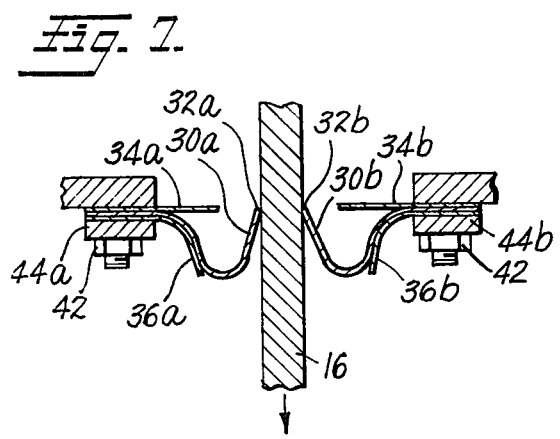
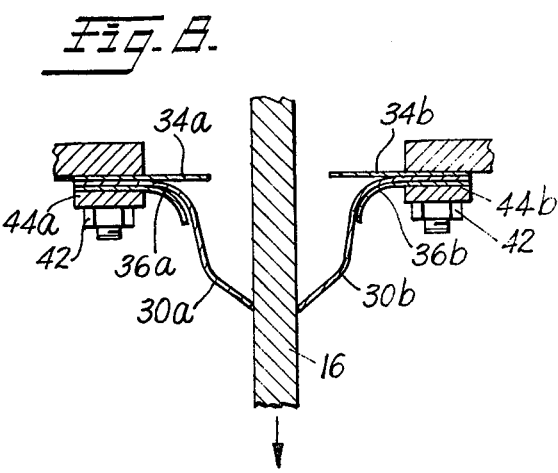
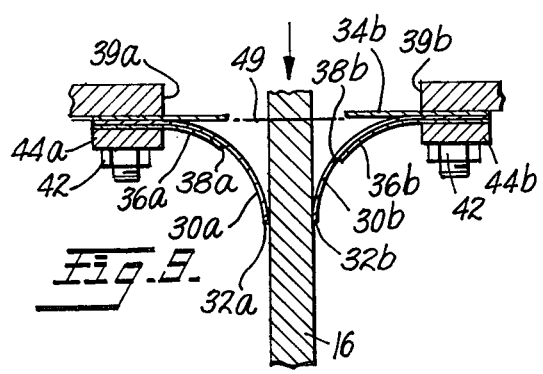
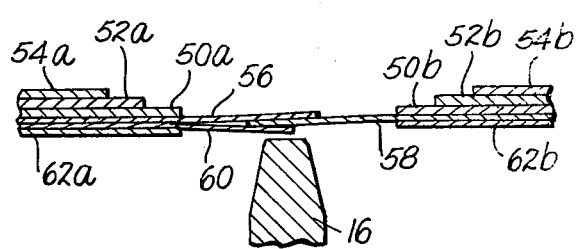
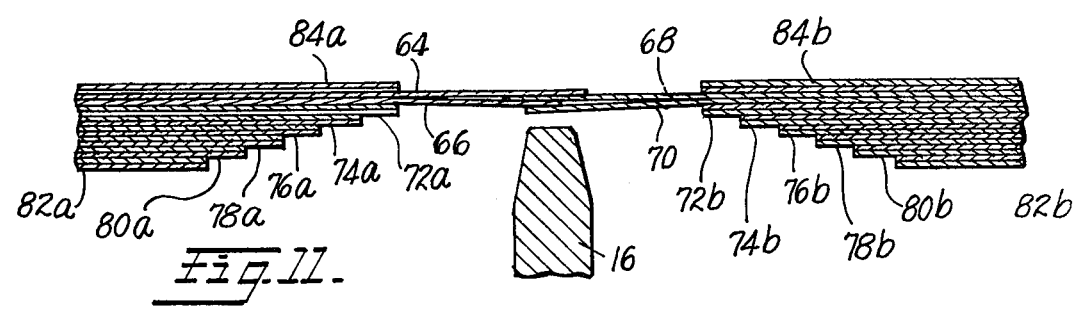

APPARATUS AND METHOD FOR SEALING DAMPERS

BACKGROUND

1. Field of the Invention

This invention relates to a method and means for sealing valves or dampers of the type wherein a closure member is completely removed from the fluid stream. Valves or dampers of this type are often used to control the flow of high temperature gases in flue ducts.

2. Description of the Prior Art

U.S. Pat. No. 3,504,833 to Beck and U.S. Pat. No. 3,504,833 to Lowe et al. are both concerned with sliding gate valves and particularly with means for sealing the aperture through which a closure member is removed from the fluid stream when the valve is fully open. Both rely on the use of strips of spring steel bent into loops for closing the aperture and for accommodating the movement of the closure member through the aperture. The loops are disposed either about the aperture or on the end of the closure member.

Co-pending application Ser. No. 639,871 filed Dec. 10, 1975 in the name of the present inventor and Peter J. Connor discloses an aperture seal including a plurality of strips which overlap each other to seal the aperture when the closure member is removed entirely from the fluid stream and which resiliently engage the closure member when it is moved toward the closed position. The engagement of the strips with the closure member causes the strips to bend into a concave configuration with respect to the interior of the fluid passageway. A series of back-up plates are provided on the side of the strips which faces the exterior of the passageway to prevent the strips from buckling as the closure member is withdrawn from the passageway toward the open position. That is, the concave bending condition of the sealing strips caused by movement of the closure member toward the closed position is maintained by the backup plate when the closure member is moved in the opposite direction, i.e., toward the open position.

The aforementioned prior art devices utilizing resilient loops of spring steel have drawbacks in that the loops, while being readily deformable in cross section, are relatively inflexible along their length. In other words, the loops tend to have a uniform deformation along their entire length which prevents them from accommodating irregularities in the surfaces to be sealed.

Considerable irregularities on surfaces to be sealed are encountered in flue gas applications. In particular, flue gases contain particulate matter, acids, and, at certain stages of operation, condensed moisture. This all leads to corrosion and heavy deposits of adhesive dirt on materials exposed to the flue gases. The result is that the surfaces of the closure member of a flue duct damper become rough and highly irregular after a relatively short period in service. The loop type seal cannot effectively accommodate these irregularities. This problem, of course remains whether the loop type seal is disposed about the aperture through which the closure member moves or is disposed on the closure member itself. In the latter instance, the surface of the seals themselves will be subject to dirt deposits and corrosion.

The sealing strips disclosed in the aforementioned co-pending application may, unlike the loop seals, exhibit lengthwise flexibility, but they do not solve the problem of corrosion and dirt deposits on the closure member. As indicated, the strips are bent into a concave condition with respect to the interior of the passageway by the closure member as it moves toward the closed position. This concave bending configuration is maintained by retainer plates as the closure member is withdrawn, that is, as the closure member moves oppositely to the direction of bend and toward the open position. This will cause the irregularities on the surfaces of the closure member to catch the leading edges of the thin metal sealing strips causing tearing of the strips and other damage.

SUMMARY

It is an object of the present invention to overcome the foregoing drawbacks.

It is a related object of the invention to provide a sealing device for a closure member which is removed entirely from a fluid passageway, which sealing device is flexible along its entire length and which is not damaged by surface irregularities caused by exposure of moveable elements to flue gases.

It is a further object of the invention to seal a flow control device with sealing strips in the aperture through which a closure member is removed by allowing the sealing strips to undergo a buckling action changing the sealing strips from a concave bending condition with respect to the fluid passageway to a convex bending condition with respect thereto and applying a resistance force to the sealing strips sufficient to maintain their sealing action.

It is a further object of the present invention to provide, in connection with an aperture through which a closure member is completely removed from a fluid passageway, a plurality of sealing strips and to apply a yieldable resistance force to the sealing strips, the resistance force being such as to allow the sealing strips to undergo a buckling action wherein the sealing strips change from a concave bending condition with respect to the interior of the fluid passageway to a convex condition with respect thereto, the resistance force along being such as to prevent movement of the sealing strips due to a pressure differential between the interior and exterior of the fluid passageways which would break the seal provided by the strips.

These and other objects, advantages, and aspects of the present invention will be more apparent from the following detailed description and claims, with reference to the accompanying drawing in which like elements or features bear like reference numerals.

BRIEF DESCRIPTION OF THE DRAWING

FIGS. 5 through 9 are fragmentary, vertical, sectional views, showing the various positions of the seals during movement of the closure member of the damper;

FIG. 10 is an enlarged, fragmentary, vertical sectional view of a modified seal assembly;

FIG. 11 is a view similar to FIG. 10, but showing another modified seal assembly.

DETAILED DESCRIPTION

Figure 1:
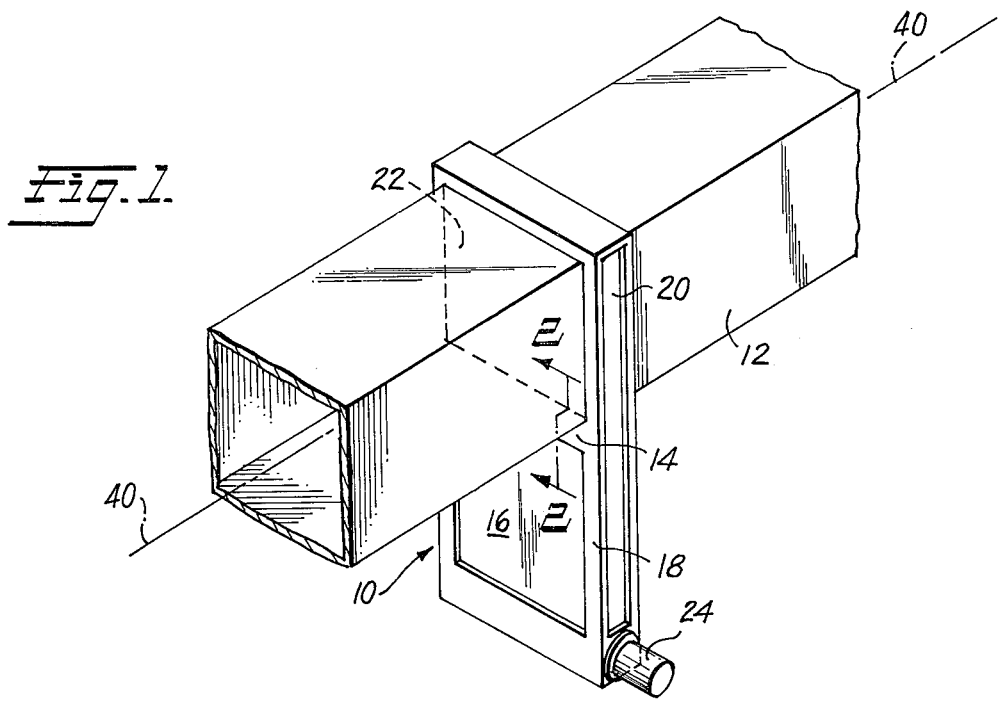
FIG. 1 is an isometric view of the damper of the present invention disposed in a flue duct.

FIG. 1 depicts a damper, generally referred to by reference numeral 10, in a flue duct 12. Damper 10 includes a body or frame 14 and a slideable closure member 16 (see especially FIG. 3) carried by the frame 14. Body 14 includes an outer portion 18 which carries the entire closure member 16 when the closure member is in the fully open position. It is preferred that the outer portion 18 be disposed below the flue duct, as illustrated, so that the closure member 16 moves upwardly toward the closed position. Of course, the outer portion 18 may alternatively be disposed above the flue duct in which case the closure member moves downwardly toward the closed position, and other positions of the damper with respect to the flue duct are possible as well. In any event, an inner portion 20 of body 14 is generally aligned with the flue duct 12 and defines a passageway 22 (FIG. 3) through which the flue gases or other fluid flows. A motor 16 cooperates with means well known in the art (not shown) to move the slideable closure member 16 between the open and closed positions.

As used herein the terms "inner", "inward", or "inwardly" refer to a direction toward the interior of fluid passageway 22, or to a disposition adjacent to or facing toward the fluid passageway. Likewise, the term "outer", "outward", or "outwardly" refer to a direction away from the interior of the fluid passageway, to a relative disposition remote from the interior of the fluid passageway, or to a disposition facing away from the interior of the fluid passageway.

Figure 2:
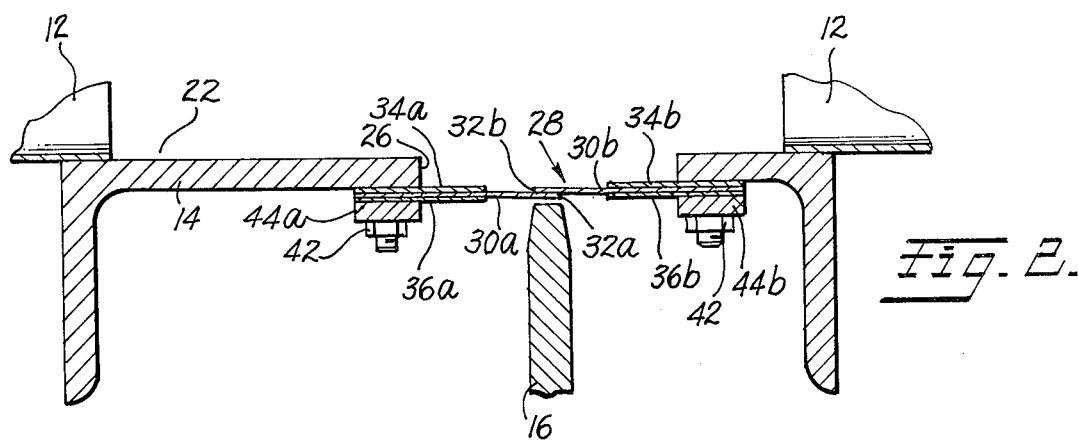
FIG. 2 is an enlarged, fragmentary, vertical sectional view, taken substantially on the line 2—2 of FIG. 1.

A preferred, simple embodiment of the sealing means of the present invention is best seen by reference to FIG. 2. An aperture 26 in body 14 effects communication between the interior of passageway 22 and the exterior. The slideable closure member 16 is shown in the open position in FIG. 2, and it will be apparent that in such position the closure member is entirely outside the fluid passageway 22. Closure member 16 is moveable through aperture 26 into the fluid passageway 22 to effect flow control. In the open position as shown in FIG. 2, flue gases may freely flow through the fluid passageway and are prevented from escaping through aperture 26 by a seal assembly generally referred to by reference character 28. This particular seal assembly embodiment, also illustrated in FIGS. 3–9, is intended for low pressure and/or vacuum applications, i.e., applications wherein the fluid pressure in the duct will not exceed plus or minus 2 inches of water.

Figure 4:
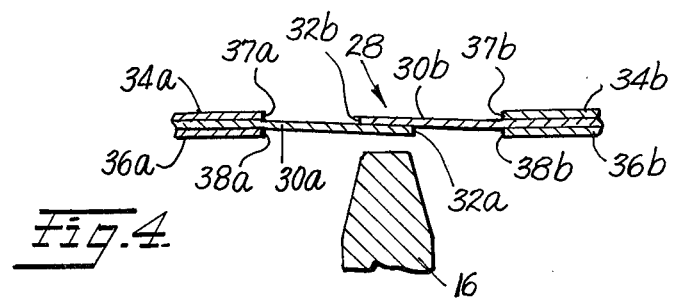
FIG. 4 is an enlarged fragmentary sectional view of the seal assembly shown in FIG. 2.

FIG. 4 presents a partial, detailed view of the seal assembly 28 when closure member 16 is in the open position as per FIG. 2. The seal assembly includes a pair of sealing strips 30a and 30b both of which extend across the aperture beyond the center thereof so as to overlap each other in sealing engagement in the region of their free ends 32a and 32b. A pair of inner support strips 34a and 34b partially overlie, respectively, sealing strips 30a and 30b on the side thereof facing the fluid passageway. Similarly, a pair of outer support strips 36a and 36b overlie, respectively, sealing strips 30a and 30b on the outer side thereof, i.e., the side facing away from the fluid passageway. The inner and outer support strips extend partially across the aperture 26 such that the free ends of oppositely disposed support strips, i.e., free ends 37a and 37b of suport strips 34a and 34b, on the one hand, and free ends 38a and 38b of support strips 36a and 36b, on the other hand, are spaced apart. Preferably the spacing between the support strips is sufficient to allow closure member 16 to freely pass therebetween without contact.

Both the sealing strips and support strips are made of fluid-impermeable, resilient material, preferably spring-tempered sheet metal. In the embodiment shown in FIGS. 2–9, the sealing strips and support strips have a thickness of approximately 0.004 inches. The range of the thicknesses for the sealing strips, however, may extend from about 0.004 inches to about 0.008 inches and the thickness range of the support strips may vary between approximately 0.004 to 0.010 inches. An embodiment wherein support strips is at the maximum end of this range will be described hereinafter. For flue gas applications wherein the materials are subject to high heat and corrosion, the preferred material for the sealing strips and support strips is a steel alloy sold under the registered trademark Hastelloy, and, in particular, Hastelloy C-276. In the drawings, the thicknesses of the sealing strips and support strips are necessarily exaggerated with respect to the dimensions of the other elements.

Figure 3:
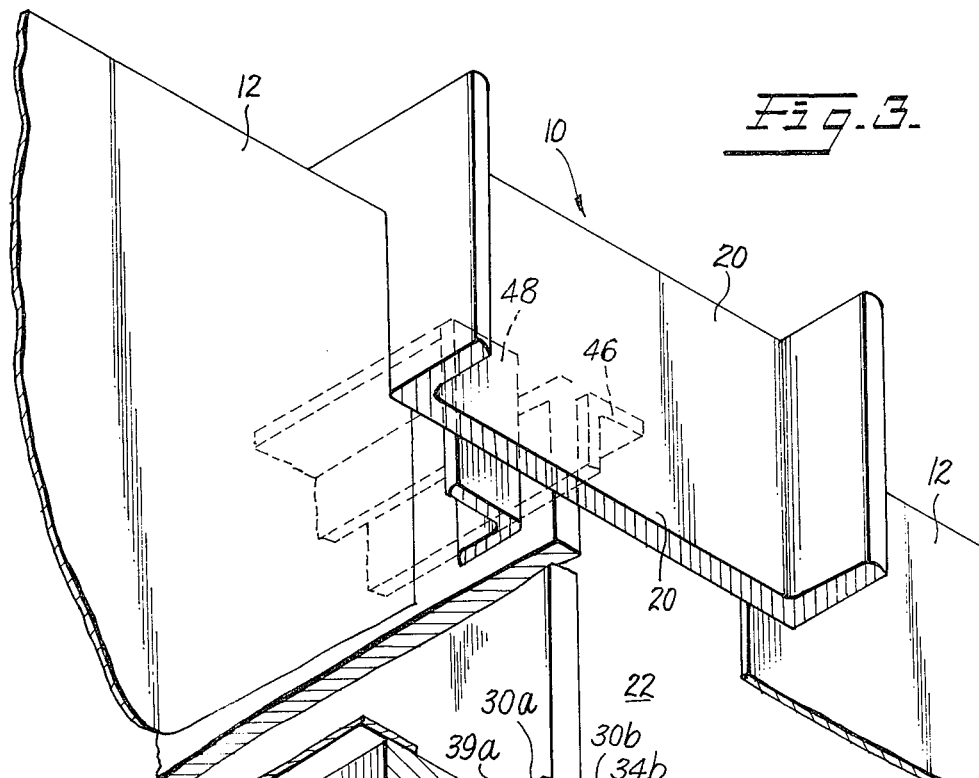
FIG. 3 is an enlarged, fragmentary, isometric view of the damper of FIG. 1.

As can best be appreciated from FIG. 3, aperture 26 extends transversely to the direction of fluid flow through the central passageway 22 of the damper. More specifically, aperture 26 is defined by a pair of spaced, parallel edges 39a and 39b extending substantially entirely across the passageway 22 transversely to the axis 40 thereof. The sealing strips and support strips are arranged in opposed stacks, one stack of strips 30a, 34a and 36a being mounted on the damper body 14 adjacent aperture edge 39a, the other stack of strips 30b, 34b and 36b also being mounted on the damper body 14, but adjacent the opposite aperture edge, namely edge 39b. Mounting of the stacks of strips is effected by threaded fasteners 42 and retainer plates 44a and 44b which exert a compressive force on those portions of the strips which overlie the region of the damper body adjacent edges 39a and 39b. It is important that retainer plates 44a and 44b do not extent significantly beyond aperture edges 39a and 39b, since the respective stacks of strips must be free to bend not only toward the interior of fluid passageway 22 but also away therefrom. Both the compressive mounting and the sandwiching of the sealing strips 30a and 30b between the inner and outer support strips 34a, 34b, 36a and 36b causes the overlapping end portions sealing strips 30a and 30b to be held together in tight, face-to-face engagement when the slideable closure member 16 is disposed entirely outside the fluid passageway 22. This tight engagement, in turn, seals the aperture against fluid flow. The plane in which the opposed sealing strips join each other in sealing engagement is the sealing plane of assembly 28.

FIG. 3 depicts the slideable closure member 16 in the closed position for blocking the flow of fluid through passageway 22 of the damper. To reach this position, the slideable closure member 16 has moved from the open position shown in FIG. 2 to engage the seal assembly 28 and bend the sealing strips 30a and 30b and the inner support strips 34a and 34b into a concave configuration with respect to the interior of the fluid passageway 22 as shown in FIG. 4. The resilient bending of these strips biases sealing strips 30a and 30b against the slideable closure member 16 thereby preserving the seal and preventing flow of fluid through aperture 26.

Slideable closure member 16 co-operates with and is guided by an upstream flange 46 and downstream flange 48 which seal the slideable closure member 16 with respect to the inner portion 20 of the damper body when the slideable gate member is in the fully closed position as illustrated in FIG. 3. It is noted that the flow of fluid, as shown by the arrow in FIG. 3, urges the slideable closure member 16 into engagement with the downstream flange 48 to prevent the flow of fluid around a closure member when it is in the closed position.

FIG. 5 provides a detailed view of the bending action of the sealing strips and support strips as the closure member 16 is moved from the open position of FIG. 2 to the closed position of FIG. 3. It will be apparent from FIG. 5 that the bending of sealing strips 30a and 30b during the closing action is in the direction of the closing action, i.e., toward the interior of the fluid passageway. Thus, free edges 32a and 32b of the sealing strips acts as trailing edges, and as such they can ride easily over the surface of the closure member and accommodate any irregularites. It will also be apparent from FIG. 5 the sealing strips 30a and 30b have moved out of engagement with one another and have undergone bending such that the free ends 32a and 32b thereof have moved in a direction away from the sealing plane 49.

FIGS. 6-9 show the sequence of changes which the sealing strips and support strips undergo during approximately the first inch of travel of the closure member from the closed position toward the open position, e.g., from the position of FIG. 3 toward the position of FIG. 2. Due to the above-described biasing of the sealing strips against the closure member and due to the relatively severe angle of attack of the sealing strips relative to the surface of the closure member (see FIGS. 3 and 5), the free ends of the sealing strips grip the surface of the closure member during initial movement of the closure member toward the open position. At first, this will cause the sealing strips 30a and 30b to bow slightly in the outward direction as shown in FIG. 6. As also shown in FIG. 6, inner support strips 34a and 34b have moved from the concave inward condition of FIG. 5 to a flat, relaxed condition. At the same time, the outer support strips 36a and 36b have begun to move outwardly and have begun to assume a slightly convex configuration with respect to the interior of the fluid passageway.

FIG. 7 shows the configuration of the support strips after a slight additional movement of the closure member toward the open position. There, the inner support strips 34a and 34b remain in a relaxed, straight condition. The sealing strips 30a and 30b continue to grip the closure member and continue to bow upwardly as they approach the point of buckling. Outer support strips 36a and 36b have taken on a highly convex condition with respect to the interior of the fluid passageway.

In FIG. 8 the closure member has moved still further toward the open position, and the sealing strips 30a and 30b have begun to actually buckle. As shown, sealing strips 30a and 30b have begun to take on a distinctly convex configuration with respect to the interior of the fluid passageway, but the changeover from the concave to the convex condition is not yet complete.

FIG. 9 shows the condition of the sealing strips and support strips at the completion of the buckling action, the condition of the strips being generally opposite to their condition of FIG. 5. As shown in FIG. 9, sealing strips 30a and 30b are in a fully convex bending condition with respect to the interior of the passageway and are biased against the closure member 16 both by their own resiliency and by that of the outer support strips 36a and 36b which are also bent into a convex configuration. As also shown, the sealing strips 30a and 30b have moved in a direction opposite to the direction which they moved during closing of the damper (FIGS. 3 and 5). That is, the free ends of sealing strips 30a and 30b have moved from a position spaced inwardly of the sealing plane 49 (FIG. 5) to a position spaced outwardly of the sealing plane (FIG. 9). Likewise, the outer support strips 36a and 36b have undergone a bending movement such that free ends 38a and 38b thereof have moved in the outward direction into a position spaced outwardly of sealing plane 49.

Figure 12:
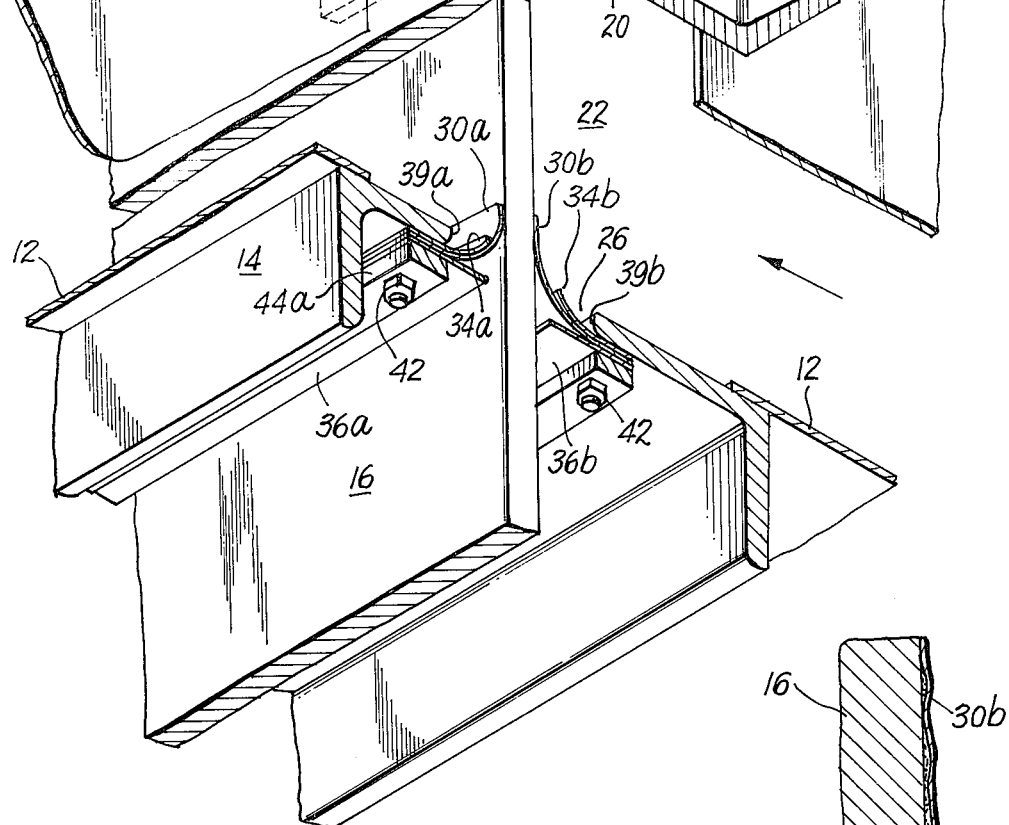
FIG. 12 is an enlarged, fragmentary, horizontal sectional view, showing the deformation of a sealing strip as it encounters deposits on the surface of the closure member taken in the line 12—12 of FIG. 5.

When the sealing strips are in the condition as shown in FIG. 9, the closure member 16 can continue to be withdrawn toward the open position, during which movement sealing strips 30a and 30b ride along the surface of the closure member in sealing engagement therewith. Since the sealing strips are now bent in the direction of the withdrawal movement, their free ends 32a and 32b act as trailing edges, and in this configuration the strips can easily accommodate irregularities in the surfaces of the closure member. Indeed, the portions of sealing strips 30a and 30b which are adjacent to the free edges 32a and 32b are readily deformable in a localized manner along their entire length, i.e., in a direction parallel to the long dimensions of aperture edges 39a and 39b. Thus, the sealing strips may deform considerably to accommodate an irregularity, such as a dirt deposit on the closure member 16 in the particular location of that deposit but remain in tight sealing engagement with a regular, flat portion of the closure member at adjacent locations. This is shown in FIG. 12.

The ability of the sealing strips 30a and 30b to accommodate irregularities in the surface of the closure member as it is withdrawn from the fluid passageway is critical in flue gas applications. As indicated earlier, flue gases contain particulate matter and acids and are periodically subject to condensed moisture. This leads to heavy deposits of dirt on the surfaces of the closure member and also leads to corrosion, all resulting in a highly irregular, moveable surface to be sealed. Heretofore, an effective apparatus and method for effecting such a seal has not been provided.

To allow sufficient freedom for outward bending and subsequent buckling and to at the same time effect sufficient resistance to outward movement of sealing strips 30a and 30b for effective sealing, the outer support strips 36a and 36b as previously described are provided. As also described and illustrated, the outer support strips 36a and 36b undergo a considerable convex (with respect to the fluid passageway) bending action as the closure member is withdrawn from the fluid passageway. It will be appreciated that outer support strips 36a and 36b both provide for outward bowing of the sealing strips 30a and 30b as to effect a buckling thereof from a concave to a convex condition with respect to the fluid passageway. At the same time, outer support strips 36a and 36b provide a resistance force against movement of sealing strips 30a and 30b, under the influence of pressure in the fluid passageway such as would break the seal which they provide when in a condition as shown in FIGS. 2 and 4.

By providing an arrangement wherein the sealing strips undergo a buckling action as illustrated and described, damage to the sealing strips during withdrawal of the closure member is prevented. The buckling action moves the sealing strips from a concave condition with respect to the fluid passageway to a convex condition with respect thereto. Thus, the sealing strips assume a condition of bending which is conductive to slideable sealing engagement with the closure plate as it is withdrawn and which accommodates for irregularities in the surface of the closure member.

The consideration of providing freedom for the sealing strips and outer support strips to bow outwardly and undergo buckling as the closure member is withdrawn from the fluid passageway is met by the countervailing consideration that the strips must not be so free to bend outwardly that the seal, provided by the strips when the closure member is entirely removed through aperture 26, would easily be broken by pressure in the fluid passageway. In other words, when the sealing strips are in the sealing condition as shown in FIGS. 2 and 4, there must be sufficient resistance to outward movement as to prevent the overlapping sealing strips 30a and 30b from moving out of tight overlying engagement with each other such as would break the seal. This is not a consideration in the known prior art device which does not provide for buckling of the sealing strips, since retainer plates, which are considerably wider than retainer plates 44a and 44b of the present disclosure, simply extend partially into the aperture area to provide a rigid backing which will prevent significant outward movement of the sealing strips under the influence of internal fluid pressure. As can readily be appreciated from the sequence of bending as shown in FIGS. 5–9 of the present disclosure, however, any rigid member extending into aperture 26 would preclude a buckling action of sealing strips 30a and 30b during withdrawal of the closure member.

Turning to the action of inner support strips 34a and 34b, it is noted that they allow inward bending of the sealing strips 30a and 30b when the closure member is in a closed position or is moving toward a closed position as shown in FIG. 5. At the same time, inner support strips 34a and 34b provide a resistance force against inward movement of sealing strips 30a and 30b, when they are in the sealing position shown in FIGS. 2 and 4, under a differential pressure which is greater at the exterior of the fluid passageway 22 than in the interior thereof.

As indicated earlier, the specific arrangement of sealing strips and support strips as shown in FIGS. 2–9 is intended for an application involving relatively low pressure differentials between the interior and exterior of the fluid passageway, i.e., pressure differentials of approximately plus or minus 2 inches of water. In that arrangement, of course, there are one pair of opposed sealing strips and one support support strips on each side of each sealing strip.

The present invention, however, also finds application in systems which are subject to considerably higher pressures and/or vacuums. Detailed views of the sealing strip and support strip assemblies for such systems are provided in FIGS. 10 and 11.

FIG. 10 shows a sealing strip arrangement for vacuums up to approximately 25 inches of water. In such an application, a relatively strong resistance force must be provided against movement of the sealing strips toward the interior such as would break the seal. In the embodiment shown in FIG. 10, a series of staggered inner support strips 50a, 50b, 52a, 52b, 54a and 54b are provided. These inner support strips are considerably thicker than the support strips of the previously described embodiment and will preferably have a thickness of 0.010 inches. Inner support strips 50a and 50b bear directly against opposed sealing strips 56 and 58 on the inward side thereof. Inner support strips 52a and 52b are disposed inwardly of support strips 50a and 50b in face-to-face staggered relationship therewith. Likewise, innermost support strips 54a and 54b are disposed inwardly of support strips 52a and 52b in staggered relationship therewith. It will be seen that the staggering of these inner support strips is in an inwardly diverging direction toward the interior of the fluid passageway. Preferably, this staggering is such that the free ends of the inner support strips in each stack are disposed about one quarter inch from each other.

In the embodiment shown in FIG. 10, there is a third sealing strip 60, the three sealing strips 56, 58, and 60 being so arranged as to interlock with each other when the closure member is removed entirely from the fluid passageway as shown in FIG. 10. Preferably, the sealing strips will have the same thickness as in the previously described embodiment, namely, about 0.004 inches.

The inner support strips 50a, 50b, 52a, 52b, 54a and 54b of the embodiment of FIG. 10 need deflect only so as to allow inward bending of the sealing strips as generally shown in FIG. 5 of the previously described embodiment. It is for this reason that they can be of a thicker dimension than the sealing strips and outer support strips.

As will be seen from FIG. 10, thin outer support strips 62a and 62b, which preferably have a thickness of 0.004 inches, are provided in overlying engagement with sealing strips 60 and 58, respectively. The action of the sealing strips and support strips of FIG. 10 is generally shown as and described in connection with the embodiment of FIGS. 2–9.

FIG. 11 is a fragmentary view of an assembly of sealing strips and support strips for systems where relatively large positive pressures are encountered in the fluid passageway. The specific embodiment illustrated is intended for positive pressures of approximately 15 inches of water. As shown, this embodiment utilizes four sealing strips 64, 66, 68, and 70 which engage each other in an alternate interlocking fashion. Sealing strips 64 and 66 are mounted together in one stack in opposed relationship to sealing strips 68 and 70 mounted together in another stack of strips on the opposite side of the aperture.

To provide a resistance force which will prevent opening of the sealing strips under high internal pressures and yet at the same time to allow for the buckling action of the sealing strips as previously shown and described, a set of 24 staggered outer support strips are provided on the outward side of the sealing strips and in stacked relationship therewith. Again, each outer support strip preferably has a thickness of approximately 0.004 inches. The strips are staggered in pairs, that is, one pair of strips in each stack extends a certain distance into the aperture and the next pair extends a certain lesser distance into the aperture to provide an outwardly diverging, staggered pattern as shown.

More specifically, a pair of support strips, both of which strips are designated by the single reference character 72a, is disposed in one stack adjacent to and outwardly of sealing strip 66, and another pair 72b is similarly disposed adjacent to and outwardly of sealing strips 70 in the opposite stack. Pairs of support strips 74a and 74b are disposed adjacent to and outwardly of support strips 72a and 72b, respectively, and extend a lesser distance toward the center of the aperture. Pairs of support strips 76a and 76b are disposed in adjacent, overlying relationship to support strips 74a and 74b, respectively, and extend yet a lesser distance toward the aperture center. Support strips 78a and 78b are disposed outwardly of support strips 76a and 76b, respectively, in the same type of overlying, staggered relationship. The same type of staggered mounting is repeated for support strips 80a and 80b and for the outermost support strips 82a and 82b.

The entire set of outer support strips wil flex in essentially the same manner as the single, outer support strips 36a and 36b of the embodiment of FIGS. 2–9 to allow the sealing strips 64, 66, 68 and 70 to buckle and move into trailing engagement with the closure member during withdrawal thereof through the aperture. Pairs of inner support strips 84a and 84b are mounted in stacked relationship next to sealing strips 64 and 68, respectively. These two pairs of inner support strips act in essentially the same manner as the single inner support strips 34a and 34b of the embodiment of FIGS. 2–9. Again, the individual support strips in pairs 84a and 84b preferably have a thickness of approximately 0.004 inches.

The invention has been described by way of preferred embodiment thereof, but many variations and modifications are possible. It will be understood that the invention is not limited by the foregoing description but rather is limited only by scope of the appended claims.

What is claimed is:

1. An apparatus for controlling the flow of a fluid comprising:
   (a) a body;
   (b) a fluid passageway through said body;
   (c) a closure member cooperating with said body for sliding movement between a closed position wherein said closure member extends into said passageway to restrict the flow of fluid therethrough and an open position wherein said closure member is withdrawn completely from said passageway;
   (d) an aperture in said body, said closure member being movable through said aperture between said open and said closed positions;
   (e) opposed, cooperating flat sealing strips mounted in said body adjacent said aperture so as to overlap each other in sealing engagement when said closure member is completely withdrawn from said fluid passageway and so as to resiliently, sealingly engage said closure member by bending of said sealing strips into a concave bending condition with respect to the interior of said passageway when said closure member is in said closed position or moving toward said closed position;
   (f) means, associated with said sealing strips, for effecting buckling of said sealing strips to change said sealing strips from said concave bending condition to a convex bending condition with respect to the interior of the fluid passageway during withdrawal of said closure member from said closed position, whereby damage to said sealing strips is prevented; and
   (g) means for preventing said sealing strips for moving out of sealing engagement with each other under the influence of a pressure differential between the interior and exterior of said fluid passageway when said closure member is completely withdrawn from said fluid passageway.

2. An apparatus for controlling the flow of a fluid as defined in claim 1 wherein said flat sealing strips are made of spring-tempered sheet metal.

3. An apparatus for controlling the flow of a fluid as defined in claim 1 wherein said preventing means includes flat, resilient, outer support strips on the side of said sealing strips facing away from said fluid passageway, said outer support strips being mounted in opposed relationship, said outer support strips extending partially across said aperture such that oppositely disposed support strips are spaced from each other, said support strips being mounted in said body such that portions of said outer support strips which extend into said aperture are free to bend away from the interior of said fluid passageway.

4. An apparatus for controlling the flow of a fluid as defined in claim 3 wherein said outer support strips are disposed in a pair of opposed stacks of strips, at least one support strip in each stack being positioned in staggered relationship with respect to another support strip in the same stack such that the stacks of outer support strips form an outwardly diverging pattern with respect to the interior of said fluid passageway.

5. An apparatus for controlling the flow of fluid as defined in claim 3 wherein said outer support strips are made of spring-tempered sheet metal.

6. An apparatus for controlling the flow of a fluid as defined in claim 3 including flat, resilient, inner support strips on the side of said sealing strips facing toward the interior of said fluid passageway, said inner support strips being mounted in opposed relationship, said inner support strips extending partially across said aperture such that oppositely disposed support strips are spaced from each other.

7. An apparatus for controlling the flow of a fluid in a passageway as defined in claim 6 wherein said inner support strips are thicker than said sealing strips and said outer support strips.

8. An apparatus for controlling the flow of a fluid as defined in claim 1 wherein said aperture is elongated and has long edges which extend generally transversely to the direction of flow of fluid through said fluid passageway.

9. An apparatus for controlling the flow of a fluid comprising:
   (a) a body;
   (b) a fluid passageway through said body;
   (c) a closure member cooperating with said body for sliding movement between a closed position wherein said closure member extends into said passageway to restrict the flow of fluid therethrough and an open position wherein the closure member is withdrawn completely from said passageway;
   (d) an aperture in said body, said closure member being movable through said aperture between said open and closed positions;
   (e) opposed, cooperating, flat sealing strips mounted in said body adjacent said aperture so as to overlap each other in sealing engagement when said closure member is completely withdrawn from said fluid passageway and so as to resiliently, sealingly engage said closure member by bending of said sealing strips into a concave bending condition with respect to the interior of said passageway when said closure member is in said closed position or moving toward said closed position;

(f) means for effecting a changeover of said sealing strips from said concave bending condition with respect to the interior of said passageway to a convex bending condition with respect thereto by way of the withdrawal of the closure member from said closed position; and (g) means for restraining said sealing strips against movement due to a pressure differential between the interior and exterior of said fluid passageway such as would break the seal provided by said sealing strips.

10. An apparatus for controlling the flow of a fluid as defined in claim 9 wherein said flat sealing strips are made of spring-tempered sheet metal.

11. Apparatus for controlling the flow of a fluid as defined in claim 9 wherein said means restraining includes flat, resilient, outer support strips on the side of said sealing strips facing away from said fluid passageway, said outer support strips being mounted in opposed relationship, said outer support strips extending partially across said aperture such that oppositely disposed supports strips are spaced from each other, said support strips being mounted in said body such that portions of said outer support strips which extend into said aperture are free to bend away from the interior of said fluid passageway.

12. An apparatus for controlling the flow of a fluid as defined in claim 11 wherein said outer support strips are disposed in a pair of opposed stacks of strips, at least one support strip in each stack being positioned in staggered relationship with respect to another support strip in the same stack such that the stacks of outer support strips form an outwardly divering pattern with respect to the interior of said fluid passageway.

13. An apparatus for controlling the flow of fluid as defined in claim 11 wherein said outer support strips are made of spring-tempered sheet metal.

14. An apparatus for controlling the flow of a fluid as defined in claim 11 including flat, resilient, inner support strips on the side of said sealing strips facing toward the interior of said fluid passageway, said inner support strips being mounted in opposed relationship, said inner support strips extending such that oppositely disposed support strips are spaced from each other.

15. An apparatus for controlling the flow of a fluid in a passageway as defined in claim 14 wherein said inner support strips are thicker than said sealing strips and said outer support strips.

16. An apparatus for controlling the flow of a fluid as defined in claim 9 wherein said aperture is elongated and has long edges which extend generally transversely to the direction of flow of fluid through said fluid passageway.

17. A sealing assembly for a flow control apparatus of the type wherein a closure member is withdrawn completely from a fluid passageway, the assembly comprising:

(a) a plurality of flat sealing strips mounted opposite to each other in overlapping sealing engagement with each other in a sealing plane, said sealing strips having free ends in the region of overlap, said sealing strips being movable out of engagement with each other by bending of the strips to allow said free ends to move in a first direction away from said sealing plane during movement of a closure member in said first direction;

(b) means associated with said sealing strips for effecting buckling of said sealing strip wherein said free ends of said sealing strips move in a second direction generally opposite to said first direction into a position spaced from said sealing plane during the movement of the closure member in said second direction; and (c) means for preventing said sealing strips from moving out of sealing engagement with each other under the influence of a pressure differential between opposed sides of said sealing strips.

18. A sealing assembly as defined in claim 17 wherein said flat sealing strips are made of spring-tempered sheet metal.

19. A sealing assembly as defined in claim 17 wherein said preventing means includes flat, resilient, support strips on the side of said sealing strips facing in said second direction, and said support strips having free ends, said support strips being disposed in mutually opposed relationship such that said free ends of oppositely disposed support strips are spaced from each other, said support strips being free to bend such that said free ends thereof may move in said second direction onto a position spaced from said sealing plane during movement of the closure member in said second direction.

20. A sealing assembly as defined in claim 19 wherein said support strips are disposed in a pair of opposed stacks of strips, at least one support strip in each stack being positioned in staggered relationship with respect to another support strip in the same stack such that the stacks of outer support strips form a diverging pattern in said second direction.

21. A sealing assembly as defined in claim 19 wherein said support strips are made of spring-tempered sheet metal.

22. A method for sealing a flow control apparatus, the apparatus having: a body; a fluid passageway therethrough; a closure member for sliding movement between a closed position wherein the closure member extends into the fluid passageway to restrict the flow of fluid therethrough and an open position wherein the closure member is withdrawn completely from the fluid passageway; an aperture in said body through which said closure member moves between said open and closed positions; opposed, cooperating sealing strips mounted in said body so as to overlap each other in sealing engagement when said closure member is completely withdrawn from said fluid passageway and so as to resilient, sealingly engage said closure member by bending of said sealing strips into a concave bending condition with respect to the interior of said passageway when said closure member is inserted through said aperture into said passageway; the method comprising the steps of:

(a) withdrawing said closure member from said fluid passageway toward said open position;

(b) allowing said sealing strips to undergo a buckling action changing said sealing strips from said concave bending condition with respect to the interior of said passageway to a convex bending condition with respect thereto by way of the withdrawal movement of said closure member, and (c) applying to said sealing strips a resistance force which restrains said sealing strips against movement due to a pressure differential between the interior and exterior of said fluid passageway such as would break the seal provided by said sealing strips.

23. A sealing method as defined in claim 22 wherein said resistance force is a yieldable resistance force.

24. A sealing method as defined in claim 23 wherein said yieldable resistance force is applied whenever said sealing strips tend to move away from the interior of said fluid passageway including during said step of allowing said sealing strips to buckle.

25. A sealing method as defined in claim 24 wherein the magnitude and pattern of application of said yieldable resistance force is selected to accommodate both said step of allowing buckling and said step of applying a resistance force.

26. A sealing method as defined in claim 25 wherein said yieldable resistance force is applied by resilient support strips partially overlying said sealing strips.

27. An apparatus for controlling the flow of a fluid as defined in claim 1, wherein:
 (a) said sealing strips define a sealing plane when in overlapping engagement with each other, said sealing plane defining a boundary between the interior and exterior of said fluid passageway;
 (b) said sealing strips include free ends; and
 (c) said means for effecting buckling includes:
  (1) means for effecting gripping engagement of regions of said sealing strips adjacent said free ends thereof with said closure member during part of the movement of said closure member from said closed to said open positions, and
  (2) means for effecting controlled outward bowing of said sealing strips from the interior side of said sealing plane to the exterior side thereof during said part of the movement of said closure member from the closed to opened position.

28. An apparatus for controlling the flow of a fluid as defined in claim 9 wherein:
 (a) said sealing strips define a sealing plane when in overlapping engagement with each other, said sealing plane defining a boundary between the interior and exterior of said fluid passageway;
 (b) said sealing strips include free ends; and
 (c) said means for effecting a changeover of said sealing strips includes:
  (1) means for effecting gripping engagement of regions of said sealing strips adjacent said free ends thereof with said closure member during part of the movement of said closure member from said closed to said open positions, and
  (2) means for effecting controlled outward bowing of said sealing strips from the interior side of said sealing plane to the exterior side thereof during said part of the movement of said closure member from the open to closed positions.

* * * * *

UNITED STATES PATENT OFFICE
CERTIFICATE OF CORRECTION

Patent No. 4,088,146　　　　　　　　Dated May 9, 1978

Inventor(s) Donald K. Hagar

It is certified that error appears in the above-identified patent and that said Letters Patent are hereby corrected as shown below:

Column 1, line 13, delete "and U.S. Pat. No.";
          line 14, delete "3,504,833 to Lowe et al, are both" and insert therefor --is--;
          line 17, delete "Both" and insert therefor --It--;
          line 18, delete "rely" and insert therefor --relies--;
          lines 21 and 22, delete these lines in their entireties.

Column 2, line 42, delete "along" and insert therefor --also--.

Column 4, line 2, delete "suport" and insert therefor --support--;
          line 45, delete "extent" and insert therefor --extend--.

Column 7, line 8, delete "conductive" and insert therefor --conducive--;
          line 57, after "one" delete the first "support".

Column 10, line 26, delete "divering" and insert therefor --diverging--.

Column 11, line 19, delete "means restraining" and insert therefor --restraining means--;
          line 25, delete "supports" and insert therefor --support--;

UNITED STATES PATENT OFFICE
CERTIFICATE OF CORRECTION

Patent No. 4,088,146     Dated May 9, 1978

Inventor(s) Donald K. Hagar

It is certified that error appears in the above-identified patent and that said Letters Patent are hereby corrected as shown below:

Column 11, line 36, delete "divering" and insert therefor --diverging--.

Column 12, line 26, delete "onto" and insert therefor --into--;

line 52, delete "resilient" and insert therefor --resiliently--.

Signed and Sealed this

*Eighth* Day of *January 1980*

[SEAL]

Attest:

SIDNEY A. DIAMOND

*Attesting Officer*     *Commissioner of Patents and Trademarks*